US005557922A

United States Patent [19]
Hoshino et al.

[11] Patent Number: 5,557,922
[45] Date of Patent: Sep. 24, 1996

[54] TURBINE

[76] Inventors: Kenzo Hoshino; Simoes Raposo Bruges de Oliveira Manueljose, both of 16-21 Daikan-cho, Hiratsuka-shi, Kanagawa-ken, Japan, 254

[21] Appl. No.: 377,738

[22] Filed: Jan. 25, 1995

[30]     Foreign Application Priority Data

Jan. 25, 1994  [JP]  Japan ................................. 6-038998

[51] Int. Cl.⁶ .................................................. F02C 7/00
[52] U.S. Cl. ........................ 60/39.75; 415/114; 415/115
[58] Field of Search .............................. 60/39.05, 39.182, 60/39.53, 39.54, 39.55, 39.58, 39.75, 39.19, 39.511; 415/114, 115

[56]            References Cited

U.S. PATENT DOCUMENTS 2,940,257   6/1960   Eckert et al. ..................... 60/39.511
4,117,669  10/1978   Heller ................................ 60/39.141
4,835,958   6/1989   Rice .................................... 415/114
5,253,976  10/1993   Cunha ................................. 415/114

FOREIGN PATENT DOCUMENTS 1302036   1/1973   United Kingdom ................. 60/39.58

Primary Examiner—Louis J. Casaregola
Attorney, Agent, or Firm—Evenson, McKeown, Edwards & Lenahan

[57]                 ABSTRACT

Surfaces of the static blades of a turbine are heated by a high temperature, high pressure working gas or heating gas passing through inner passages formed inside the static blades, so that the working gas which passes through interspaces defined between adjacent ones of the static blades, expands nearly isothermally without a drop in temperature so as to boost an output of the turbine.

1 Claim, 8 Drawing Sheets 5,557,922

TURBINE

FIELD OF THE INVENTION

The present invention relates to a turbine such as, for example, a turbine used in a thermo-electric power generating plant.

BACKGROUND OF THE INVENTION

One example of a prior art electric generating turbine is shown in FIG. 8, in which air is introduced as shown in direction 5 from an inlet 4 to an axial flow compressor 1 to be compressed to a high pressure and then fed into a combustion chamber 2 through an inlet 12 thereof, while the combustion chamber is fed with fuel through another inlet 11. In the combustion chamber the combustion of fuel with the compressed air generates working gas which is introduced through nozzle 17 and static blades 15,15' to dynamic or running blades 16 of the turbine to drive the turbine shaft 8. The shaft 8 is connected to an electric generator 10.

FIG. 9 shows a system of a conventional turbine for an electric power plant, in which working gas is introduced to the compressor 1 through an inlet 5 and is pressurized there. The compressed air is brought into the combustion chamber 2 through the inlet 12 of the passage 18, while fuel is fed into the combustion chamber 2 through the inlet 11. Combustion gas having a high temperature and a high pressure, which means the working gas, is introduced to the turbine 3 through the nozzle 17 to thereby rotate the rotor shaft 8 to drive the load 10, and discharges through an outlet port 6. The stator blades serve to change pressure energy of the gas to velocity energy, and the dynamic blades change the velocity energy of the gas to rotary motion energy of the turbine rotor, this motion energy being changed to electric energy by means of the load 10. In this connection, work energy of the working gas is indicated as an area ABCD in FIG. 11, wherein B means the state of the air before entering the combustion chamber, C means the state of the air when it enters the static blades from the combustion chamber, and D means a state of the air when it flows out of the static blades. It is thought that work quantity corresponding to the area ABCD changes to velocity energy of the working gas.

FIG. 10 shows a system of an exemplified conventional turbine of the so called external combustion type (heated type) in which the working fluid for driving the turbine is heated with a heating fluid in a heating chamber. In this system, work energy of the working fluid is represented as the area ABCD in FIG. 11.

In commonly accepted technique, in order to enlarge the above mentioned area ABCD so as to obtain more electric energy through the load (ex. generator), various means to increase the length BC have been adopted. That means to elevate possibly the temperature of C in comparison with the temperature of B by means of a combustion room. Such an increase enlarges the specific volume. For the purpose, heat-resisting materials used for the turbine have been developed, whereby the temperature of C could be elevated. At present, where the temperature of B is of room temperature, i.e. nearly 300° K. (27° C.), the temperature of C can be elevated to 1600° K. However, it will be appreciated that it is not easy to elevate the temperature of C higher than that.

SUMMARY OF THE INVENTION

An object of the invention is to provide an improved turbine which enables to generate electric energy more efficiently by means of enlarging the above area ABCD without such elevation of the temperature of C. In the turbine of our invention, working fluid expands along an improved expansion process CD" from the identical temperature of C by improving the conventional expansion process CD.

In order to attain the object of the invention, according to the invention, a turbine mentioned below is provided. Namely, in a turbine according to our invention described in claim 1, as shown in FIG. 1, working gas, i.e. a high temperature, high pressure gas, delivered from the combustion chamber 2 is introduced to a collector pipe 19 through a nozzle 24, passes through an inlet 21, inner passages 20 and an outlet 22 of static blades and is introduced to the subsequent collector pipe 19 and then to the subsequent static blades. The working gas which has finally entered a collector pipe 19' by way of the interior of the first stage of static blades passes through interspaces of the first stage of static blades 15' from turbine inlet 25 thereby to be accelerated therethrough, gets into the first dynamic blades 16', and flows succesively through static blades and dynamic blades of the turbine to drive the turbine rotor. As shown in FIG. 2, the inner passages 20 are arranged to extend in the static blades from the inlet 21 of the inner passages through a pathway with a turn formed inside the static blades to the outlet 22. This arrangement is shown in FIG. 3, in which the gas passes from the compressor 1 through the combustion chamber 2 to static blades-heating means 26, enters the turbine 3 from the heating means and discharges through the outlet 6 thereby to drive the rotor shaft 8 and the load 10.

A turbine according to one embodiment has, in addition to the turbine described in claim 1, a feature that working gas having passed through the inner passages and the outlet of the static blades is introduced to a recombustion chamber to be re-heated.

A turbine according to one embodiment, in an external combustion turbine in which working fluid is heated with a heating fluid and drives the turbine, has a feature that the heating fluid is conducted to an inlet of static blades of the turbine, said static blades having said inlet, passages through which the heating fluid passes formed inside the static blades and an outlet, and said heating fluid delivered passes through the passages from the inlet and flows out through the outlet.

A turbine according to still another embodiment, in an external combustion turbine, has a feature that said working fluid heated with the heating fluid is conducted to an inlet of static blades of the turbine, said static blades having said inlet, passages formed inside the static blades and an outlet of the passages, and said heated working fluid passes through the passages from the inlet, flows out through the outlet and then is fed into interspaces defined between adjacent ones of the static blades to thereby act on dynamic blades of the turbine to rotate the turbine rotor.

A turbine according to a further embodiment, in addition to the feature of the turbine described in previous embodiment, has a feature that the working fluid having passed through the passages of the static blades is introduced to a heater to be re-heated.

Therefore, since the working gas which passes through the static blades and the dynamic blades is heated by the static blades, the working gas expands nearly isothermally. This leads to an increase in driving energy for the turbine.

DESCRIPTION OF THE PREFERRED EMBODIMENTS

The invention and advantageous details will now be explained more fully below with reference to exemplary embodiments and with the aid of the accompanying drawings.

Figure 11:
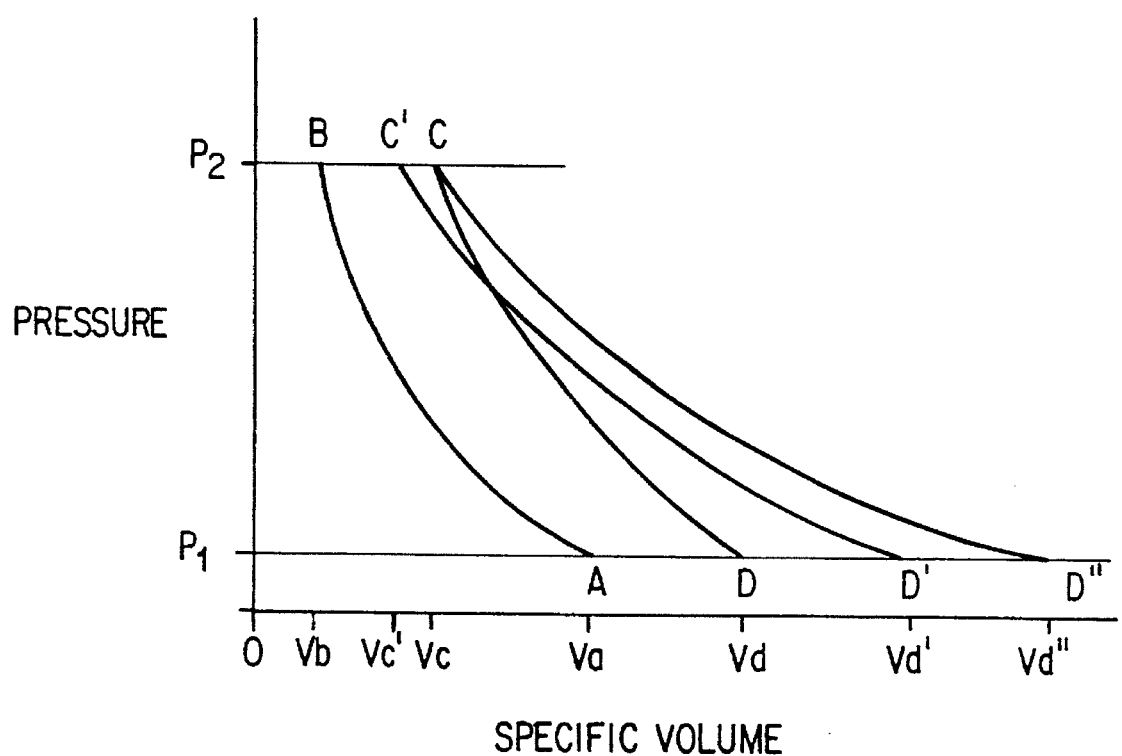
FIG. 11 illustrates a pressure-specific volume diagram of the working gas in a turbine.

FIGS. 1, 2, 4(a) and 4(b) illustrate a turbine and its members according to the invention, and FIGS. 3, 5, 6 and 7 illustrate respectively a system relative to turbines embodied by the invention. FIG. 11 is a diagram showing pressure-specific volume relationship for comparing a turbine according to the invention with a prior art one.

Figure 1:
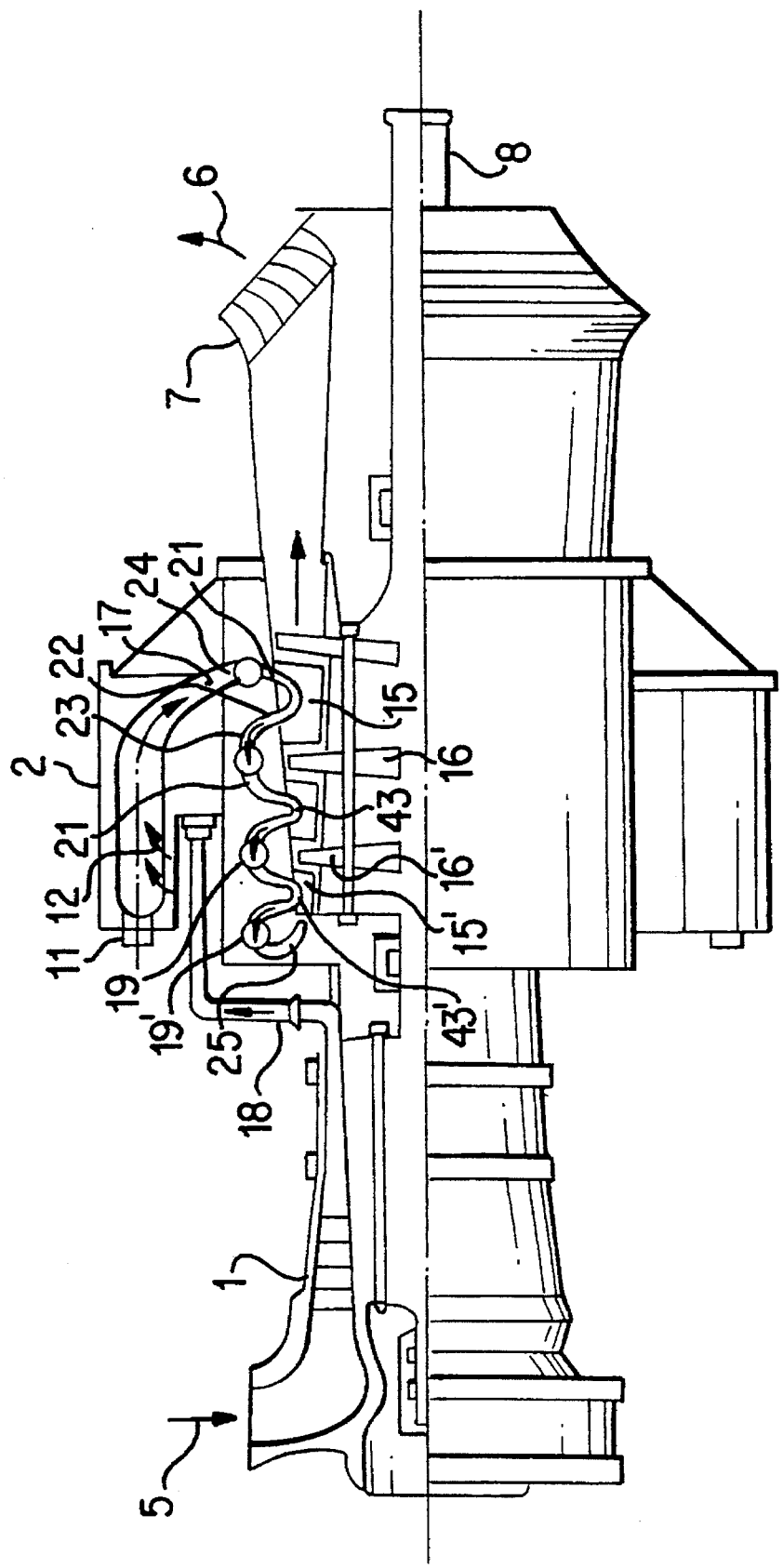
FIG. 1 illustrates a top plan view of a turbine as an embodiment of the invention.

As shown in FIG. 1, air enters a compressor 1 through an inlet 5 and is pressurized at the compressor. The compressed air passes through a passage 18 and an inlet 12 to a combustion chamber 2 in which fuel sent through a fuel port 11 is burnt with the air to generate a high temperature, high pressure gas. Said gas is then introduced through a passage 24 and a collector pipe 19 to an inner passages 43 formed inside the static blades and passes therethrough to heat the static blades, and sequentially enters subsequent collector pipe 19 along arrow 23, the inner passages 43 of subsequent static blades and therethrough further subsequent collector pipe, and the inner passages of further subsequent static blades and so forth. The working gas finally flows out of the inner passages 43' of the first static blades 15', enters the collector pipe 19' and passes through an inlet passage 25 and interspaces between adjacent ones of the first static blades 15', and therefrom the working gas is jetted into the first dynamic blades, sequentially passes through a series of the static and dynamic blades and flows out as gas flow 6 through a duct 7. The dynamic blades 16' and 16 rotate to drive the turbine rotor 8 as well as the load.

Figure 2:
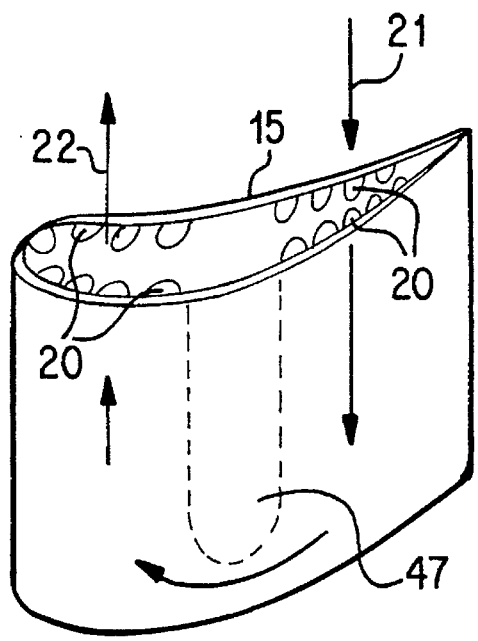
FIG. 2 illustrates a perspective view of an example of a static blade used in a turbine according to the invention.

FIG. 2 shows an example of the inner passages of a static blade in which 20 denotes passages for the working gas. The working gas enters the static blades 15 through an inlet 21 of the inner passages of the static blades and discharges out of an outlet 22 of the inner passages as shown by arrows. 47 shows an area in which said inner passages are not formed. In order for the working gas flowing outside the static blades to be heated effectively, the inner passages are desirably formed possibly adjacent the surface of the blade.

Figure 4A:
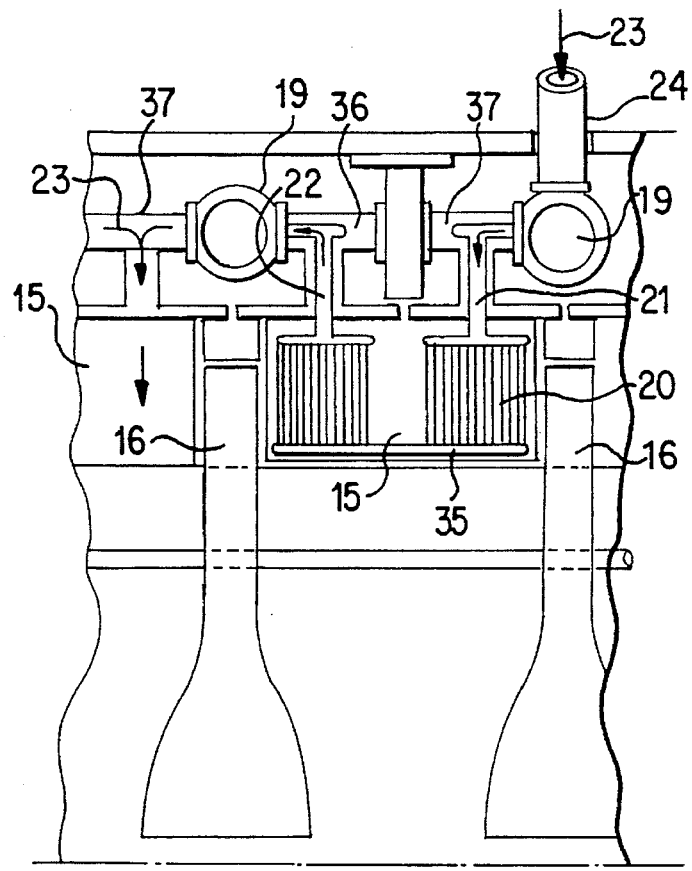
FIG. 4(a) illustrates a top plan view showing an example of a static blade, a dynamic blade and passages formed in the static blade.

FIG. 4(a) shows an elevational cross-section of an example of a static blade in a turbine of the invention. This is arranged so that the working gas in the collector pipe 19 is introduced to the inlet 21 of the inner passages of the static blades from a distributor 37, passes through passages 20, 35 and 20, flows out through the outlet 22 of the inner passages and enters the collector pipe 19 by way of collector 36.

Figure 4B:
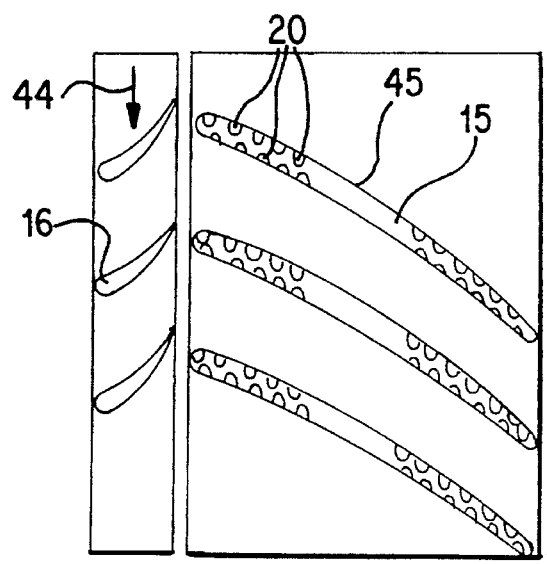
FIG. 4(b) illustrates a cross-section showing an example of static blades and dynamic blades.

FIG. 4(b) shows a circumferential cross-section of the dynamic blades 16 and the static blades 15, in which arrow 44 denotes a direction of rotation. This is in contrast with FIG. 4(a). In a turbine of the invention, since it is needed to heat the working gas efficiently in contact with the static blades, the surface of the static blade will preferably be as large as possible. Heat transfer between the static blade surface 45 and the working gas passing through interspaces defined between adjacent ones of the static blades is performed effectively because the surface 45 is enlarged. (Relevant Japanese Pat. Appln. No.77976/1989)

Figure 3:
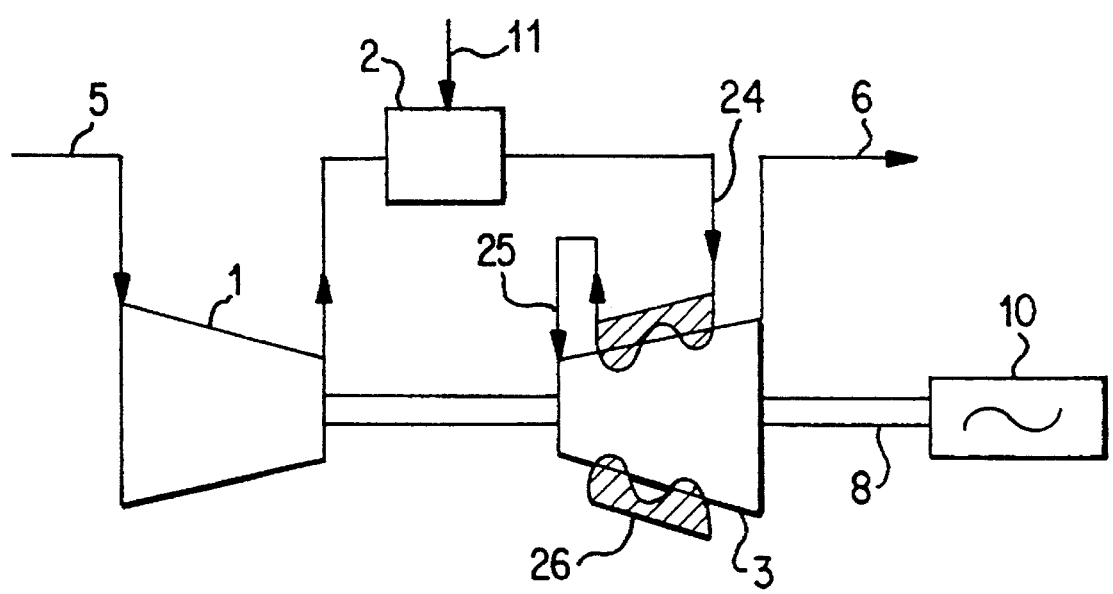
FIG. 3 also illustrates a system of a turbine embodied by the invention.

FIG. 3 shows a system of a turbine according to the invention, in which air introduced through the inlet 5 is compressed to a high pressure at the compressor 1 and heated at the combustion chamber 2. The heated air passes through the static blade heater 26 and acts on the turbine rotor 8 to drive the load 10.

Figure 5:
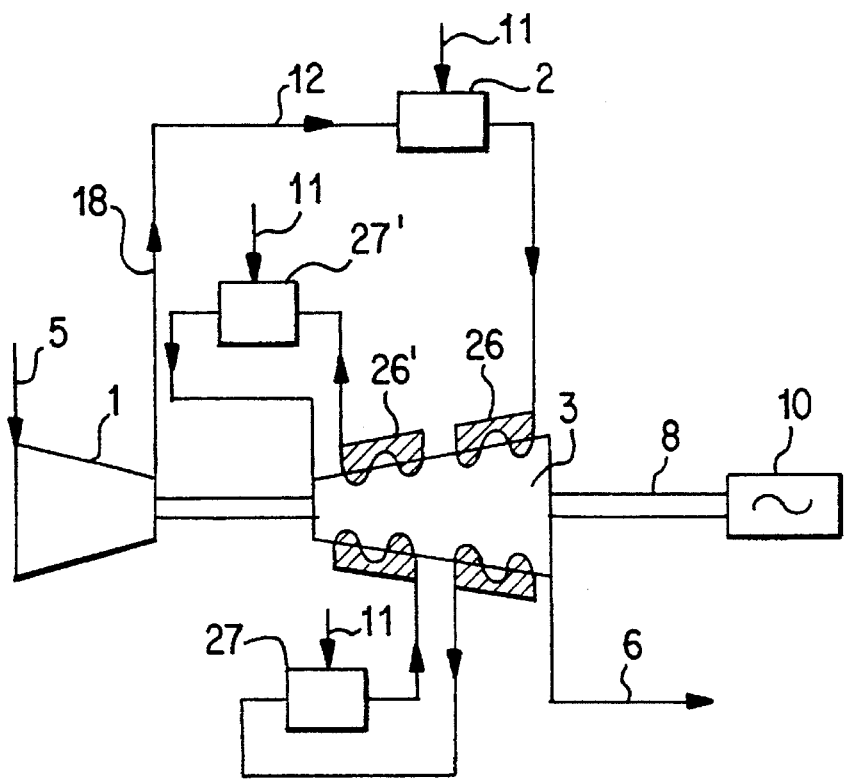
FIG. 5 illustrates a system showing another embodiment of a turbine according to the invention.

As shown in FIG. 5, the working gas flowing out of the combustion chamber 2 is introduced to and passes through the static blade heater 26', after that, enters a recombustion room 27' to be heated again and thereafter is introduced to the turbine 3 to avoid a considerable thermal drop of the working gas, which effects enough expansion of the working gas so as to increase the turbine output.

Figure 6:
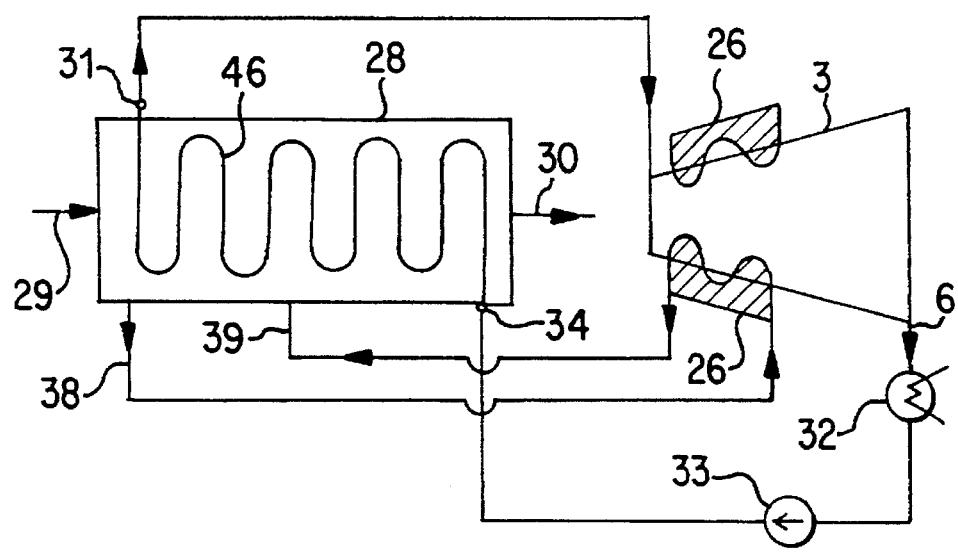
FIG. 6 illustrates a system showing other different embodiment of a turbine according to the invention.

FIG. 6 shows a system of an embodiment of an external combustion turbine according to the invention. In this system a heating gas enters a heater 28 through an inlet 29 and flows out through an outlet 30. A pipe 46 for the working gas is heated in the heater 28 in which the working gas introduced there through an inlet 34 is heated to a high temperature and leaves there through an outlet 31 to drive the turbine 3, and flows out through the outlet 6. The working gas flowing out through the outlet 6 is introduced again to the inlet 34 after passing through a cooler 32 and a compressor 33. On the other hand, the heating gas flowing out through an outlet 38 of the heater 28 is introduced to the static blade heater 26, passes therethrough, enters again the heater 28 through an inlet 39 and discharges through the outlet 30, thereby to keep the static blades at a high temperature to increase the turbine output.

Figure 7:
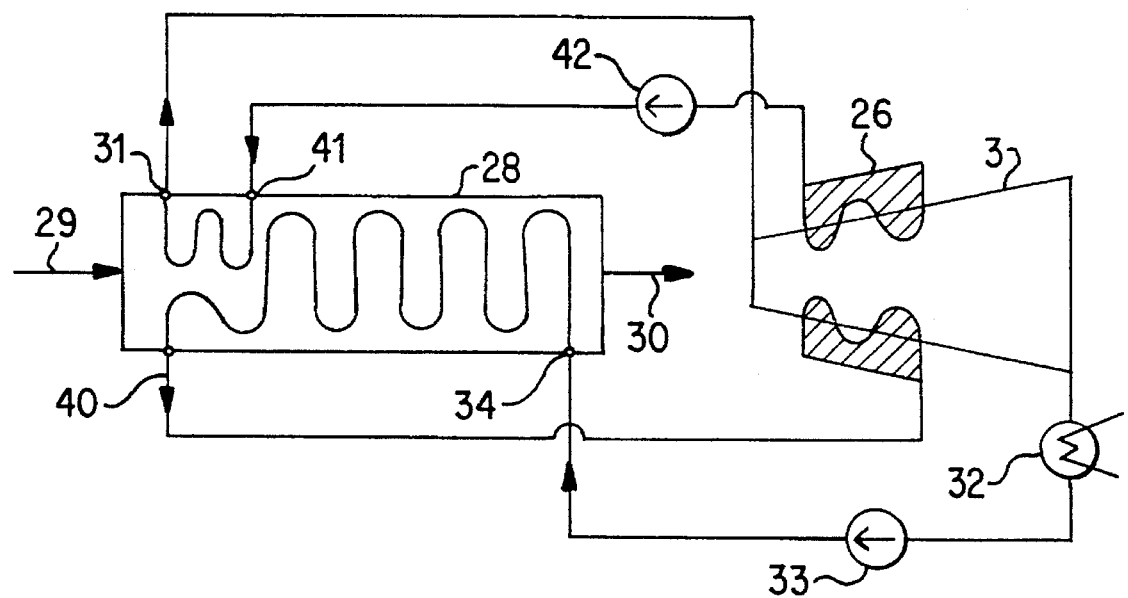
FIG. 7 also illustrates a system showing a further different embodiment of a turbine according to the invention.
Figure 8:
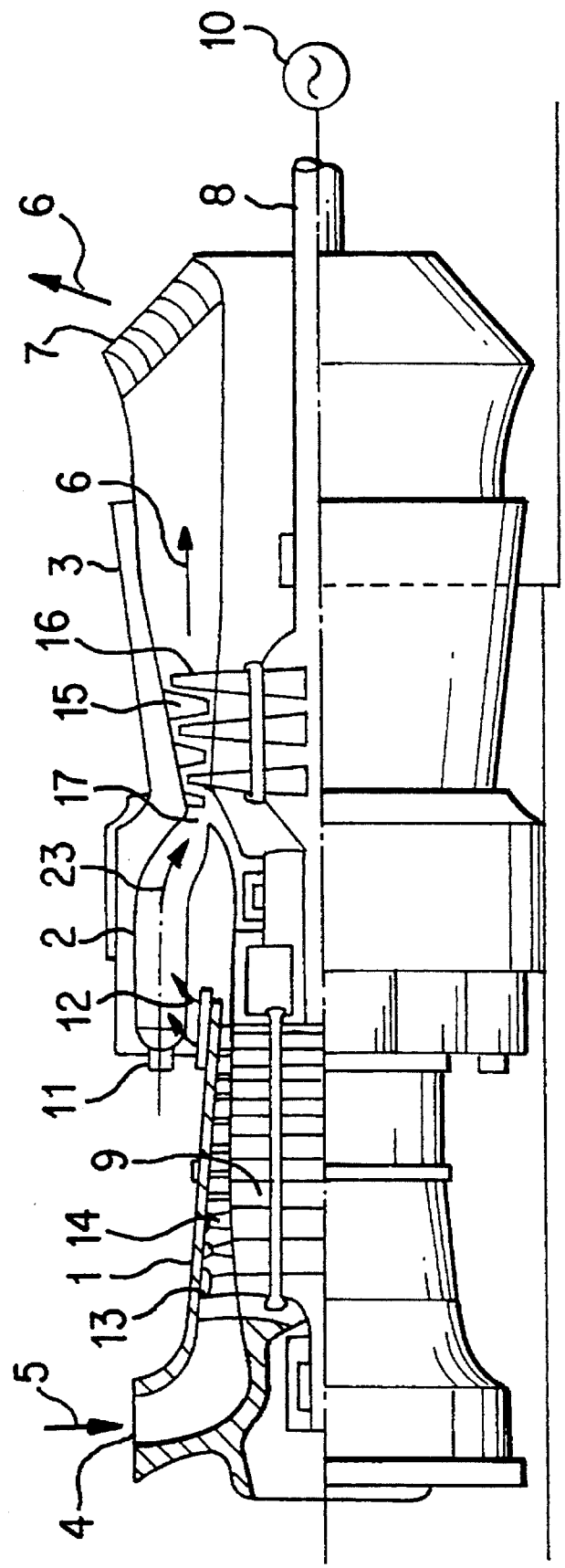
FIG. 8 illustrates a top plan view of an example of a prior art turbine.
Figure 9:
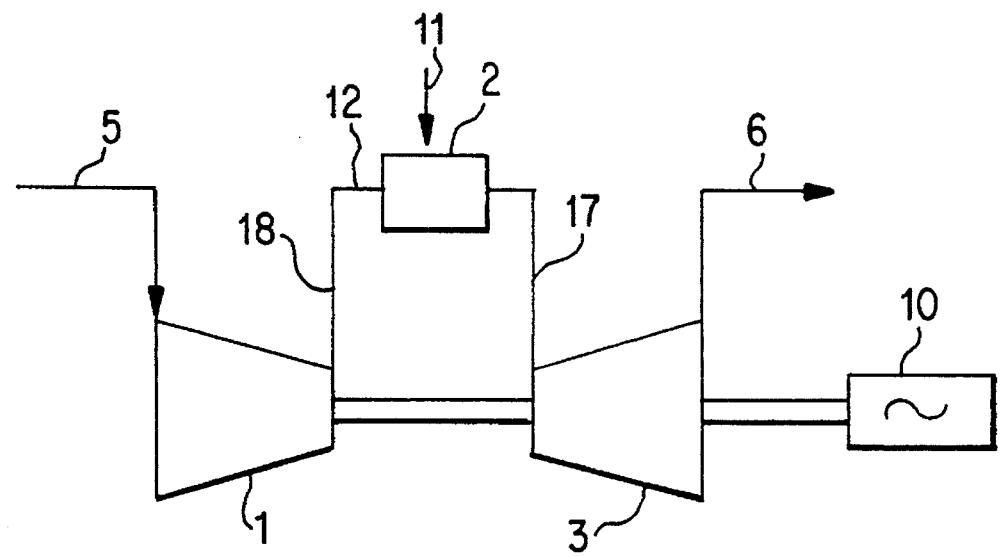
FIG. 9 illustrates a system of an example of a prior art turbine.
Figure 10:
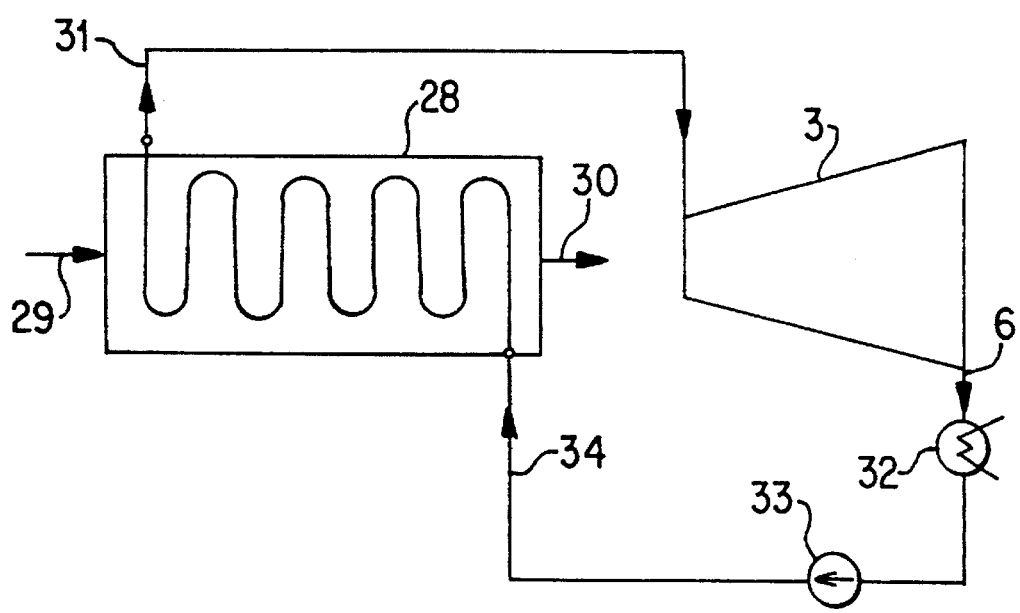
FIG. 10 illustrates a system of an example of a prior art external combustion turbine.

FIG. 7 shows a system of our turbine, in which the working gas brought in the static blade heater 26 is re-inserted to the heater 28 through an inlet 41 to be heated and discharged through an outlet to act on the turbine 3. After that, the working gas passes through the cooler 32 and the compressor 33 and is introduced to the working gas inlet 34 to be heated in the heater and thereafter to the static blade heater 26 through an outlet 40.

FIG. 11 shows a pressure-specific volume diagram of a turbine according to the invention. As seen in the diagram, the working gas in a prior art turbine is compressed from point A (pressure P1, specific volume Va) to point B (P2, Vb) and then heated in the combustion room from point B to point C (P2, Vc) with an expansion of the gas. After that, while the working gas expands from point C to point D (P1, Vd), work done by the working gas is represented as an area ABCD. On the other hand, in a turbine of the invention, as the working gas passes through the static blade heater 26, the temperature of the working gas at the entrance of the first static blades of the turbine is lowered from point C to point C', but the expansion of the working gas causes along a slant line C'D' which is similar to an isothermal process CD' in contrast with an adiabatic process represented by CD, and therefore the area ABC'D' is larger than the area ABCD.

As mentioned above, according to the present invention, the working gas passes through the inner passages 23 of the static blades almost without any pressure fall and thereafter is introduced to the turbine. Also, the working gas is heated during its expansion, so that the expansion of the working gas is nearly isothermal rather than adiabatic. Accordingly, since the pressure difference seems to be almost the same, a turbine of the invention can do more work than a prior art one, and thus the invention will realize an efficient turbine.

In the turbine described in claim 1, working gas flowing out of the combustion chamber is introduced to the inlet of the passages formed inside the static blades and passes through the interior of the static blades. The working gas which flows out of the outlet of the passages of the static blades is fed into interspaces defined between adjacent ones of the static blades to act on the dynamic blades of the turbine so as to rotate the turbine rotor. As the static blades are heated with high temperature gas, the surfaces of the static blades are of a high temperature and serve to heat the working gas passing through interspaces between adjacent ones of the static blades. Although in a prior art turbine, the temperature of the working gas which passes through interspaces between adjacent ones of the static blades is lowered in its adiabatic expansion and the gas which expands adiabatically from point C in FIG. 11 is represented as CD, in a turbine according to the invention the working gas is heated in contact with the static blades and therefore the expansion of the working gas is represented as nearly isothermal expansion line CD", so that its expanded volume is increased by DD" more than the point D of a prior art adiabatic expansion and work due to the expansion is increased by a quantity corresponding to an area CDD" thereby to increase rotary energy of the turbine and to feed more energy to the load.

Otherwise, for example, by means that the inner passages of the static blades are of uniform cross-section, a high temperature, high pressure gas can pass through the passages almost without any expansion. Accordingly, the working gas has a descent in temperature at the first static blades of the turbine, while the gas can enter the first static blades almost without a drop of pressure. In this case, expansion process is represented as ABC'D' and its area is larger than the area ABCD.

Also in the turbine described in claim 2, because the working gas passing through said inner passages of the static blades provides heat to the working gas passing through interspaces between adjacent ones of the static blades, the temperature of the former working gas is lowered. Thus, as shown in FIG. 5, by means that the working gas leaving the heater 26 that heats the interior of the static blades passes through the recombustion room 27 and enters the static blade heater 26', the surfaces of the static blades are always kept a high temperature thereby to heat thoroughly the working gas passing through the interspaces of the static blades, so that the working gas expands nearly isothermally and therefore increases expansive work thereof to drive the turbine rotor more efficiently. In this situation, the expansion process is represented nearly as ABCD".

Furthermore in the turbine described in claim 3, by conducting high temperature heating fluid in an external combustion turbine through the interior of the static blades, the static blades are heated and therefore expansion of the working gas is increased thereby to increase the rotary energy of the turbine rotor.

In the turbine described in claim 4, because thee working gas of high temperature in an external combustion turbine, similar to the case in the internal combustion turbine described in claim 1, passes through the interior of the static blades thereby to heat the working fluid passing through interspaces between adjacent ones of the static blades, the working fluid expands nearly isothermally and expansion of the working fluid is increased, which results in an increase in the rotary energy of the turbine rotor.

Also, in the turbine described in claim 5, the working fluid of which temperature has lowered after passing through the inner passages of the static blades is heated again by a heater to elevate the temperature of the working fluid, so that its expansion process corresponds to CD" in FIG. 11 and its expansion is increased thereby to enlarge the rotary energy of the turbine rotor.

Although in a prior art it is required to elevate extremely the temperature of the working gas in a combustion room in order to increase the driving power of the turbine, according to the invention more output of the turbine can be obtained by heating the working gas by a quantity that corresponds to a descent in temperature, without such an extreme elevation of temperature.

As described above, although a turbine of prior art is based on an adiabatic expansion, a turbine of the invention adopts a nearly isothermal expansion of the working gas. Therefore, where the working gas is of the same pressure as well as of the same temperature in both turbines, considerably more output can be obtainable in a turbine of the invention.

Having now fully described the present invention, it will be apparent to one of ordinary skill in the art that many changes and modifications can be made without departing from the spirit or scope of the invention as set forth herein.

What is claimed is:

1. A turbine having an entrance; a combustion chamber; and static blades and dynamic blades, and interspaces defined between adjacent ones of the static blades; said static blades having passages formed inside the blades, an inlet to said passages, and an outlet from said passages; a recombustion chamber; means for conducting working gas from said combustion chamber to said inlet; means for conducting said working gas from said outlet to said recombustion chamber; whereby the gas passes serially into each blade through its inlet, through the passages thereof, and flows out through the outlet into and through said recombustion chamber, and then enters the turbine through its entrance; and means for feeding said gas entering through said entrance into said interspaces to thereby act on the dynamic blades of the turbine to rotate the dynamic blades.

* * * * *